United States Patent Office 3,183,477
Patented May 11, 1965

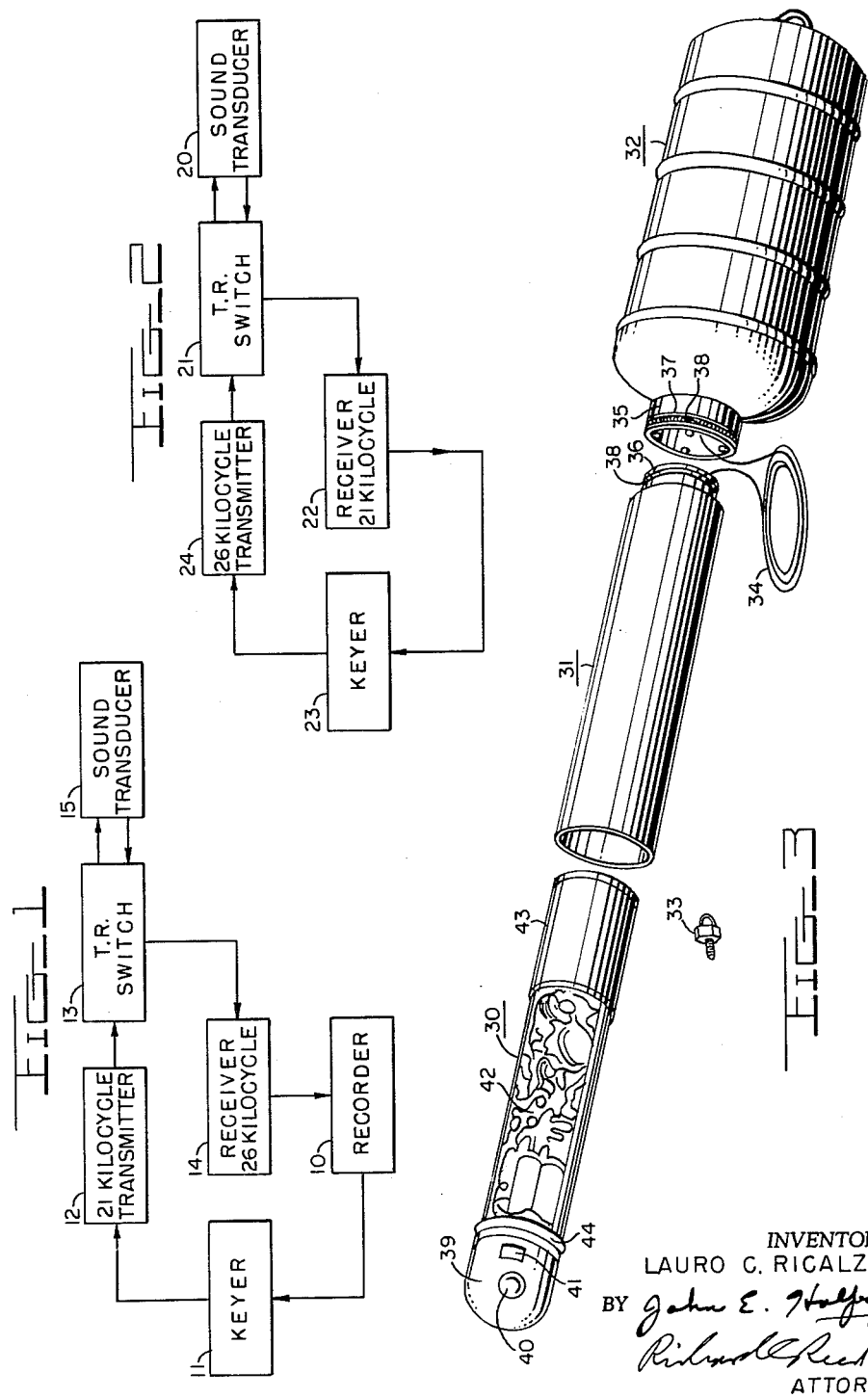

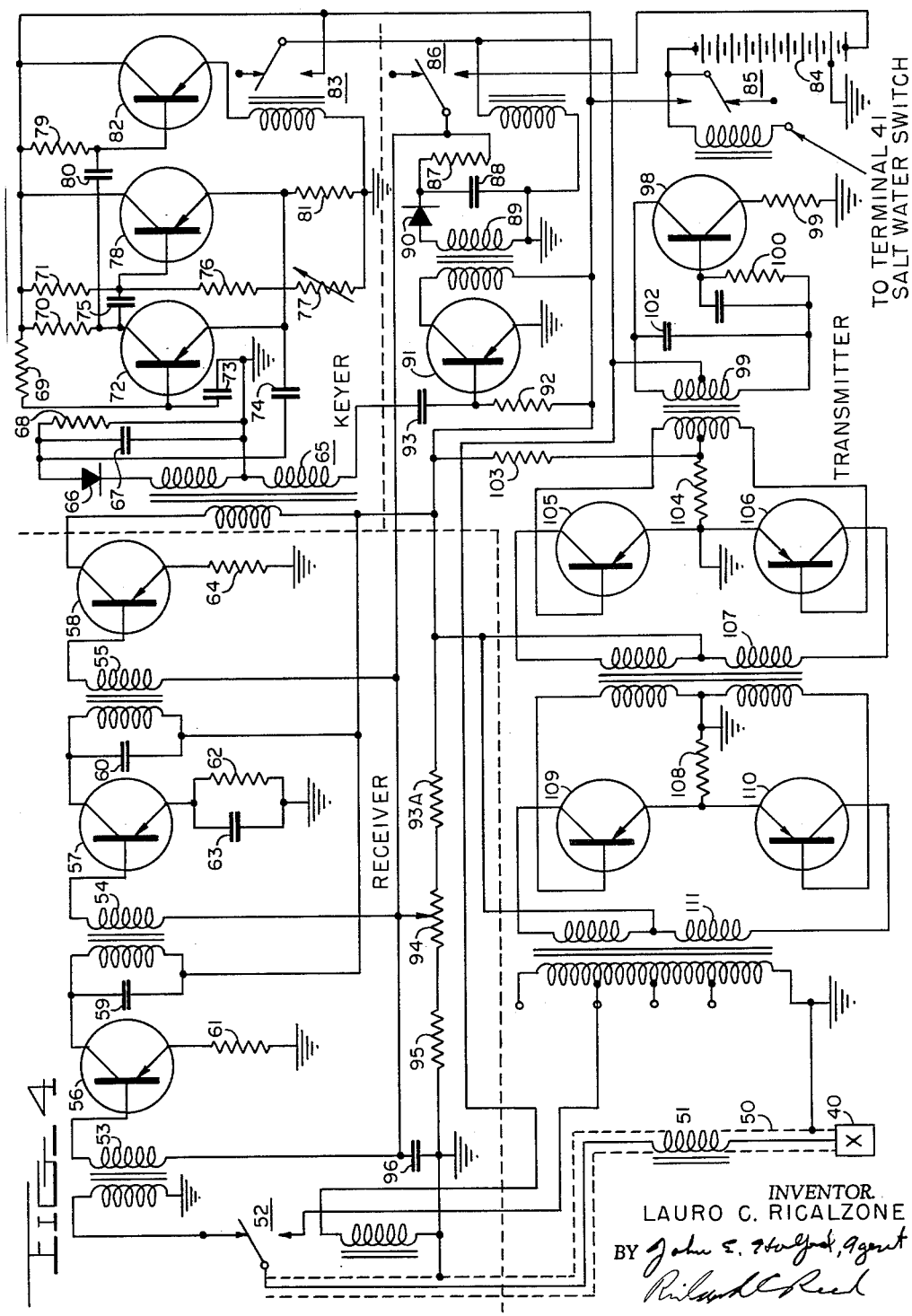

3,183,477
ACOUSTIC DISTANCE MEASURING EQUIPMENT
Lauro Clement Ricalzone, Forest Heights, Md., assignor to the United States of America as represented by the Secretary of the Navy
Filed Jan. 30, 1963, Ser. No. 255,129
4 Claims. (Cl. 340—2)
(Granted under Title 35, U.S. Code (1952), sec. 266)

The invention described herein may be manufactured and used by or for the Government of the United States of America for governmental purposes without the payment of any royalties thereon or therefor.

The present invention is directed to a method and apparatus for determining the distance between two objects in water. More specifically one aspect of the invention pertains to a portable buoy or similar structure, the position of which can be quickly and accurately ascertained with sonic instruments.

One example of the need for such a measurement occurs in tests of weapons systems employing aerial torpedoes or the like. In order to determine the efficiency of such systems against submarines, the submarine would release a dye marker or smoke flare as soon as the torpedo could be detected. The miss distance would then be determined visually. This system has many sources of error, as for example, variations in the speed or course of the submarine, the point on the submarine from which the flare is released, as well as the more obvious visual errors.

An object of the present invention is, therefore, to provide a method of accurately and quickly determining the distance between two objects in water.

A further object of the invention is to provide reliable, compact, and portable apparatus for performing the above method.

These and other objects or attendant advantages of the present invention will be best understood with reference to the following specification and accompanying drawings wherein:

FIG. 1 shows a block diagram of a data processing unit to be used in making underwater distance measurements;

FIG. 2 shows a block diagram of a transponder unit to be used in making the same measurements mentioned above;

FIG. 3 shows an exploded view of a buoy unit incorporating the transponder unit of FIG. 2; and FIG. 4 shows a transistorized embodiment of the transponder in FIG. 2.

Referring to FIGURES 1 and 2 there are shown block diagrams of the electronic equipment necessary for performing underwater distance measurements between two objects according to the invention. The circuit of FIG. 1, which shall be called a data processing unit, is located at or in one of the two objects, and the transponder unit of FIG. 2 is similarly associated with the other object. As can be seen the circuits in the two figures are very similar, the chief difference being the recorder 10 in FIG. 1.

The recorder is a conventional unit as used in sonar systems. Chart paper moves through the recorder at constant speed to provide a time base. A moving stylus travels normal to the movement of the chart paper to display the relative timing of a series of events in vernier fashion which occur after selected base times. Such recorders are provided with a timing switch which closes at the beginning of each sweep of the stylus.

The timing switch controls the transmission of interrogation pulses in sonar systems. In the present system it controls the keyer 11, which in turn energizes a 21 kilocycle electrical signal source 12. The output pulse from this source first activates a TR switch 13 to disconnect the receiver 14, in order to prevent damage to delicate low level circuitry therein, and subsequently drives the transducers 15. Due to the normal delay of the TR switch, at least one transient pulse usually reaches the receiver which has sufficient magnitude to operate the recorder stylus. This mark serves as a record that a sound pulse was generated at the time indicated.

Referring to FIG. 2 the transponder receives the 21 kilocycle pulse by means of a second transducer 20. The low level electrical signal from this transducer passes through the quiescent TR switch 21 to the receiver 22 tuned to 21 kilocycles. The signal is amplified and reshaped, if necessary, to provide a suitable signal for operating the keyer 23. The keyer actuates a 26 kilocycle transmitter 24, which opens TR switch 21, thereby disconnecting the receiver 22 and thereafter drives the transducer 20 at the high frequency.

Returning to FIG. 1 the higher frequency return signal is picked up by the transducer 15 and passes through the normally closed TR switch 13. Amplifier 14 strengthens this return signal and shapes it to drive the printing circuit attached to the stylus of the recorder.

The recorder recycles the foregoing events every second, so that the units may be used successfully at ranges up to 600 yards. For longer ranges, a greater interval, available on most recorders, may be used. By using a different frequency for the return signal, the effects of surface reverberation are minimized and omnidirectional transducers can be employed. The electronic delay time of the transponder is presumed to be negligible, but could be calibrated, if accuracy required it.

Referring to FIG. 3 there is shown one embodiment of the transponder unit. The unit consists of three main portions: a transponder assembly 30, housing cover 31 and a float 32. The transponder assembly and cover when joined form a watertight housing around the electronic components. The two elements are held together by means of a screw 33 which extends through the upper closed ends of both. The density of the combined elements is greater than seawater.

The upper portion of the unit is a closed hollow container having an average density much less than seawater so that the average density of elements 30, 31, and 32 is less than water. A line having a length several times that of the entire transponder is connected between the housing cover 31 and the float 32. It can be noted that the head of screw 33 includes an eyelet for this purpose and a similar screw may be attached to the float.

The cover 31 also has a second mode of coupling to the float. The float and cover have hollow cylindrical portions 35 and 36 extending from their end surfaces which fit snugly within one another. The cylindrical portions have external cylindrical grooves which overlie when the portions are nested. The groove in the larger portion 35 is drilled through at several points and fitted with metal balls which project through into the wall of cylindrical portion 35 but are too large to pass through the apertures provided for them. An elastic band fashioned from a coil spring 38 is snapped into groove 37 over the balls to hold them in place. This structure allows the balls to snap into groove 36 as the two portions are nested. The line 34 is stored in the compartment defined within these portions.

The lower portion 30 contains the electronic components grouped in three sections. The transducer section, which forms the bottom of the unit includes a transducer 40 encapsulated in a suitable plastic 39. Various transducers could be used, but the preferred model was a hollow sphere of piezoelectric material, such as barium titanate with a few percent of lead zirconate, having electrodes plated on its inner and outer surfaces. A metal electrode is embedded in the plastic nose 39 with one exposed surface flush with outer surface of the plastic.

Next to the plastic nose is located the circuitry 42 for the receiver, transmitter, keyer and TR switch. The transducer and electrode 41 are electrically connected to this section by leads which pass through the abutting face of plastic nose (not shown) and are partly embedded therein. Electrode 41 forms one terminal of a salt water switch, the remaining terminal being the cover 31, which when connected to assembly 30 forms part of the common current return for the electronic circuitry.

In the opposite end 43 of the transponder assembly are located the batteries which power the electronic circuits. For convenience a number of small batteries were combined and encapsulated in cylindrical form to conform to the inner diameter of section 43.

The overall buoy structure described above is easily fabricated from readily available material. Most of the buoy is made of aluminum because of its light weight, strength and resistance to corrosion. Polyester resins such as diallylphthalate or any other of the well known potting compounds which have sound propagation characteristics similar to water may be used for encapsulation of the transducer and batteries. The line 34 was a nylon cord having a test strength of 100 lb. A rubber washer 44 is placed between the back face of the nose section and the open end of cover 31 to insure that the overall transponder housing will be watertight. A similar washer should be used with the screw 33.

Referring to FIG. 4 there is shown a schematic diagram of the electronic circuitry. The circuitry is divided into three major portions which are separated by dashed lines, the receiver, the keyer, and the transmitter. All circuits are transistorized.

The receiver is essentially a three stage transformer coupled tuned amplifier. It has a bandwidth of 400 cycles and a gain of 110 db. It has an automatic gain control, which can be adjusted to operate with a wide range of noise levels.

The keyer consists of a crystal diode detector and a one-shot multivibrator. The period of the multivibrator is adjustable to vary the length of the return pulse.

The transmitter includes a single stage oscillator driving a two stage push-pull driver. Again, transformer coupling is employed. The output level of the transmitter is approximately one watt. A detailed description of the circuit components of the transmitter and other circuits is given in Table A.

Table A

| Element | Name | Description |
| --- | --- | --- |
| 50 | Conductor | Shielded Coaxial. |
| 51 | Inductor | Toroidal Core Diameter 1.3", μ=125, #29 wire, reactance equal to capacitive reactance of transducer at 26 kc. |
| 52 | Relay | 6 v. D.C. SPDT. |
| 53 | Transformer | Primary 50 ohms, Secondary 200 ohms. |
| 54 | do | Toroidal Core Diam. 0.08", μ=60, #29 wire, primary 425 turns, secondary 75 turns. |
| 55 | do | See element 54. |
| 56 | Transistor | 2N175. |
| 57 | do | 2N175. |
| 58 | do | 2N175. |
| 59 | Capacitor | Value to tune transformer to 21 kc. |
| 60 | do | See element 59. |
| 61 | Resistor | 220 ohm, ½ watt. |
| 62 | do | 220 ohm. |
| 63 | Capacitor | 25 mfd., 20 volts Electrolytic. |
| 64 | Resistor | 220 ohm. |
| 65 | Transformer | Primary 15,000 ohms, Secondary 95,000 ohms. |
| 66 | Diode | 1N34. |
| 67 | Capacitor | 0.25 mfd., 200 volt. |
| 68 | Resistor | 22K ohm. |
| 69 | do | 510K ohm. |
| 70 | do | 18K ohm. |
| 71 | do | 82K ohm. |
| 72 | Transistor | 2N105. |
| 73 | Capacitor | 0.05 mfd., 200 volt. |
| 74 | do | 1 mfd., 200 volt. |
| 75 | do | 0.75 mfd., 200 volt. |
| 76 | Resistor | 39K ohm. |
| 77 | Potentiometer | 5K ohm, ½ watt. |
| 78 | Transistor | 2N105. |
| 79 | Resistor | 390K ohm. |
| 80 | Capacitor | 0.5 mfd., 200 volt. |
| 81 | Resistor | 8.2K ohm. |

Table A—Continued

| Element | Name | Description |
| --- | --- | --- |
| 82 | Transistor | 2N188. |
| 83 | Relay | 6 v. D.C. SPDT. |
| 84 | Battery | 11 C cells in series tapped at +15 volts. |
| 85 | Relay | 5,000 ohm SPDT. |
| 86 | do | 6 v. D.C. SPDT. |
| 87 | Resistor | 560 ohm. |
| 88 | Capacitor | 100 mfd., 6 volt Electrolytic. |
| 89 | Transformer | Primary 20,000 ohms, Secondary 800 ohms (DOT-1). |
| 90 | Diode | 1N34. |
| 91 | Transistor | 2N105. |
| 92 | Resistor | 1 Megohm. |
| 93 | Capacitor | 0.05 mfd., 200 volt. |
| 93A | Resistor | 220 ohm. |
| 94 | Potentiometer | 5K ohm. |
| 95 | Resistor | 200 ohm. |
| 96 | Capacitor | 150 mfd., 6 volt Electrolytic. |
| 97 | Transformer | Toroidal Core 0.8" Diam., μ=60, #29 wire, primary 425 turns tap at 75, secondary 150 center tap. |
| 98 | Transistor | 2N105. |
| 99 | Resistor | 330 ohm. |
| 100 | do | 150K ohm. |
| 101 | Capacitor | 0.001 mfd., 200 volt. |
| 102 | do | Tunes primary of transformer to 26 kc., 200 volt. |
| 103 | Resistor | 10K ohm. |
| 104 | do | 10K ohm. |
| 105 | Transistor | 2N188. |
| 106 | do | 2N188. |
| 107 | Transformer | Toroidal Core 1.3" Diam., μ=125, #27 wire, primary 200 turns, secondary 300 turns, both center tapped. |
| 108 | Resistor | 3.3 ohm, ½ watt. |
| 109 | Transistor | 2N68. |
| 110 | do | 2N68. |
| 111 | Transformer | Two Toroidal Cores 1.3" Diam., μ=125, #27 wire, primary 200 turns center tapped, secondary 250 turns tapped at 100, 150, and 200 turns. |

All Resistors ¼ watt carbon unless otherwise specified.
All Capacitors 200 volt tubular paper type unless otherwise specified.

The circuits may be constructed on standard fiber insulating boards and mounted in the transponder assembly by means of the standard L brackets. The sequence of operation of these circuits is controlled by signal operated relays, beginning with relay 85 which is closed by the salt water switch. These same circuits may be used in the data processing circuit of FIG. 1 by retuning the receiver stages and transmitter oscillator and interposing a sonar recorder between the receiver and keyer.

One use of the present apparatus is to check the accuracy of weapons systems which employ air dropped weapons against submarines. The buoy is dropped with or in place of the weapon. When the buoy strikes the water the transponder disconnects itself from the float, except for line 34, and sinks as far as the latter will permit. A data processing unit which is carried by the submarine is set into operation prior to drop and records the miss distance. Neither the submarine operator nor the operator of the weapons system needs to reveal his position to the other to obtain this data.

The characteristics of the buoy structure make it a very versatile tool. Other methods of using the buoy include, forming temporary navigation systems for submarines by dropping one or more buoys at prearranged locations, and marking mine fields. Because of its lightweight construction, the entire buoy weighs 10–15 pounds, it is easily handled by one man. Its mode of operation conserves battery power, since power is removed automatically when the buoy is retrieved. Eleven C-cell batteries provide about 40 hours of use.

Obviously many modifications and variations of the present invention are possible in the light of the above teachings. It is therefore to be understood that within the scope of the appended claims the invention may be practiced otherwise than as specifically described.

What is claimed is:

1. An underwater acoustic distance measuring equipment, comprising:

a plurality of transmit-receive means separately located at distances to be measured and acoustically responsive to each other so that a signal received by one will cause it to transmit which transmission will in turn be received and cause subsequent transmission by other of said transmit-receive means;
at least one of said transmit-receive means being contained within a portable buoy of the type providing:
a buoyant member capable when floating in water of supporting a watertight member;
a watertight member containing the circuitry of one of said transmit-receive means,
said buoyant member adapted to contain said watertight member when the buoy is out of water and to release said watertight member when said buoy is dropped into the water;
each of said transmit-receive means comprising:
a transmitter;
a receiver;
a transducer;
switch means alternately coupling said transmitter and said receiver to said transducer;
and a keyer connected and responsive to said receiver for triggering said transmitter upon receipt of a signal from said receiver;
the transmitters of said transmit-receive means each transmitting at a different frequency;
the receivers of said transmit-receive means each being tuned to the frequency of the transmitter of one other of said transmit-receive means;
and at least one of said transmit-receive means including recording means coupled to the receiver thereof to provide time-based indication between a transmitted and a received signal.

2. An underwater acoustic distance measuring equipment as recited in claim 1, wherein said buoy-contained transmit-receive means are battery powered, and the watertight member of said buoy having a metallic portion which forms one part of a seawater switch for supplying the battery power to the circuitry of said transmit-receive means.

3. A transponder for acoustic distance measuring equipment comprising:
a receiver for receiving a pulse at a preselected frequency;
a transmitter for transmitting a pulse at another frequency upon receipt of a pulse by said receiver;
a transducer;
switch means alternately connecting said transmitter and said receiver to said transducer,
said switch means being activated by said transmitter to connect said transmitter to the transducer thereby disconnecting said receiver from said transducer upon receipt of a signal by said receiver;
keying means connected and responsive to said receiver for triggering said transmitter upon receipt of a signal from said receiver;
a watertight chamber encompassing said transponder means and having a plastic cap at one end thereof for encapsulating said transducer and coupling means at the other end thereof;
float means detachably coupled to said chamber by said coupling means;
a line many times the length of said chamber connecting said chamber to said float means;
said float means being capable of buoying said chamber by said line when both are immersed in water,
whereby said float means and said watertight chamber form a single unit coupled by said coupling means, which unit can be broken apart by the impact of the surface of water when said unit is dropped from a sufficient height, or manually disengaged so that said chamber is suspended from said float means by said line when both are immersed in water.

4. A transponder as recited in claim 3, wherein said watertight chamber has a metallic portion which forms one contact of a seawater switch for supplying power to said transponder means.

References Cited by the Examiner
UNITED STATES PATENTS

| | | | |
|---|---|---|---|
| 2,428,799 | 10/47 | Hayes et al. | 340—3 |
| 2,758,203 | 8/56 | Harris | 340—2 X |
| 3,038,143 | 7/62 | Dow | 340—5 |
| 3,076,519 | 2/63 | Alsabrook | 181—0.5 |

FOREIGN PATENTS

| | | | |
|---|---|---|---|
| 646,396 | 8/62 | Canada | 340—2 |

OTHER REFERENCES

"Exploring Subsurface Waves With Neutrally Buoyant Floats," by Pochapski, ISA Journal, vol. 8, No. 10, October 1961, pp. 34–37 relied on.

CHESTER L. JUSTUS, *Primary Examiner.*